United States Patent

[11] 3,612,518

| [72] | Inventor | David F. Bennett<br>1100 Fleetwood Ave., Daytona Beach, Fla. 32014 |
|---|---|---|
| [21] | Appl. No. | 881,544 |
| [22] | Filed | Dec. 2, 1969 |
| [45] | Patented | Oct. 12, 1971 |

[54] OCCUPANT PROPELLED MERRY-GO-ROUND
7 Claims, 11 Drawing Figs.

[52] U.S. Cl. ..................................... 272/33 R
[51] Int. Cl. ..................................... A63g 1/12
[50] Field of Search ........................... 272/33 R,
33 A, 39, 46, 28, 35, 34, 36, 37, 40, 41, 42, 43, 47, 48, 1 B, 1 C

[56] References Cited
UNITED STATES PATENTS

| 1,143,454 | 6/1915 | Smith | 272/33 |
| 1,368,132 | 2/1921 | Gavlak | 272/33 |
| 1,783,586 | 12/1930 | Dos Santos | 272/33 |
| 2,992,824 | 7/1961 | Lew'chuck | 272/40 |

Primary Examiner—Anton O. Oechsle
Assistant Examiner—Arnold W. Kramer
Attorney—John N. Randolph ABSTRACT: An occupant propelled merry-go-round having a tub-shaped passenger compartment providing an annular seat and an annular backrest surrounding the seat. The passenger compartment is rotatably supported by a stationary supporting structure which additionally supports a handwheel centrally of the passenger compartment. The handwheel is rotatable in one direction only relative to the supporting structure so that when torque is applied thereto in the opposite direction by one or more of the occupants, the compartment is caused to rotate in the first mentioned direction. A brake including a lever conveniently disposed and mounted for universal rocking movement for manual actuation by any of the passengers is provided to effect stopping of rotation of the passenger compartment.

PATENTED OCT 12 1971 SHEET 1 OF 4 3,612,518
FIG.I.
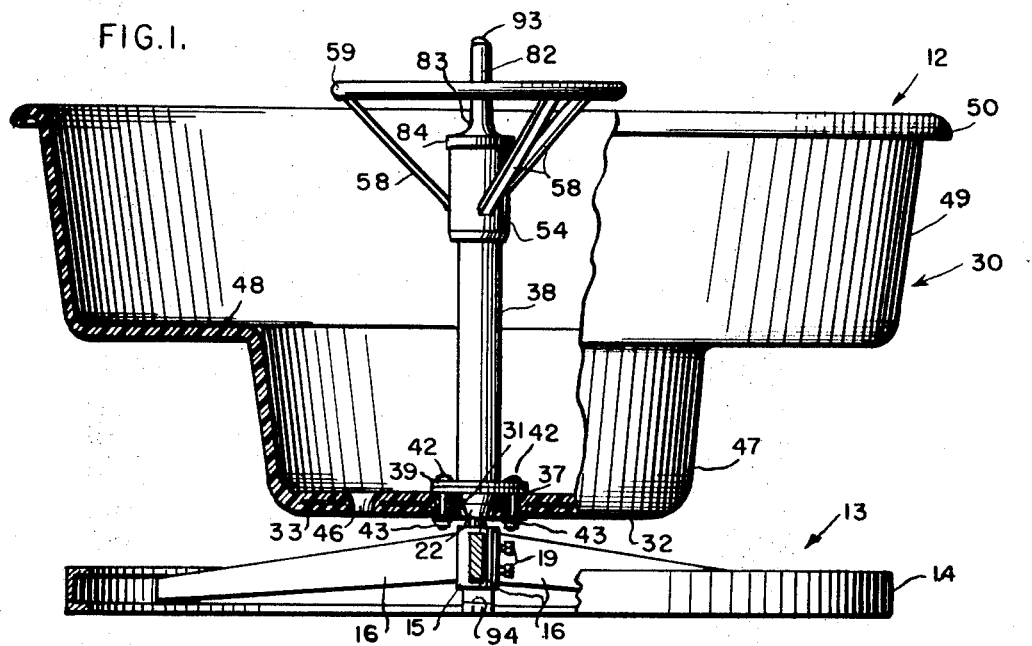
FIG.II.
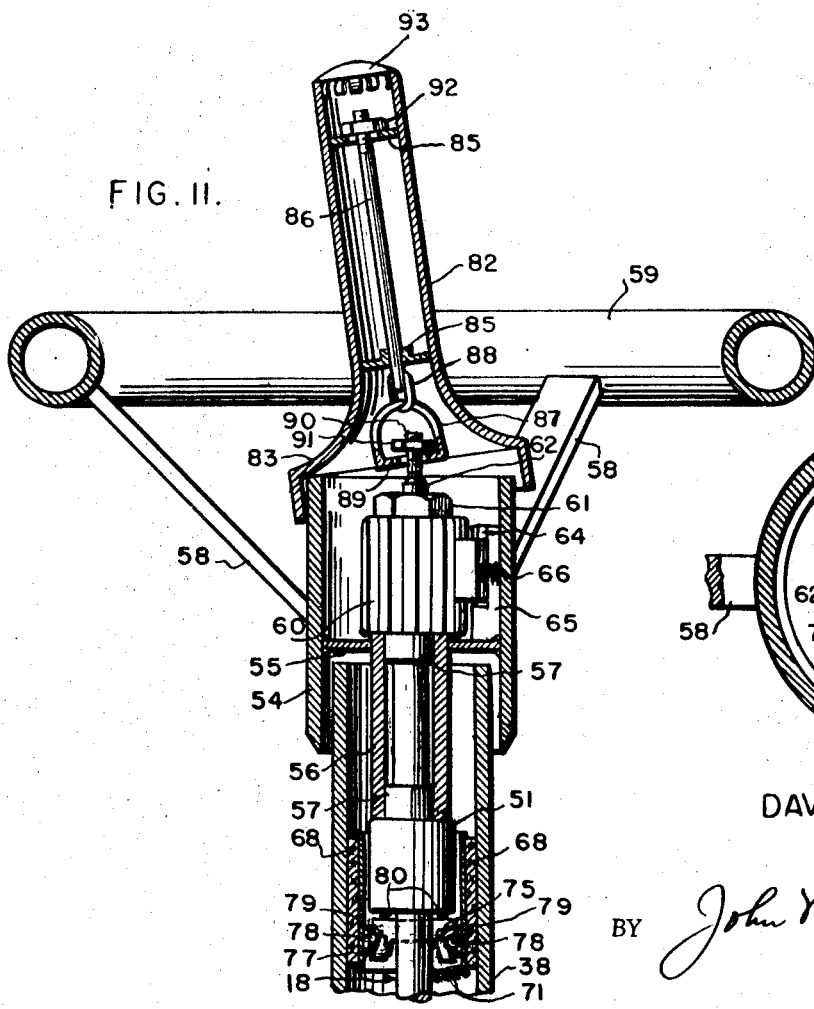
FIG.10.
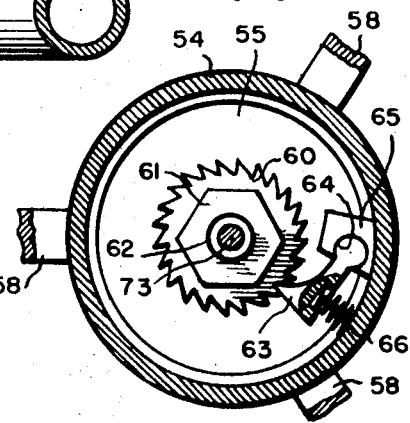
INVENTOR
DAVID F. BENNETT
BY *John N. Randolph*
ATTORNEY

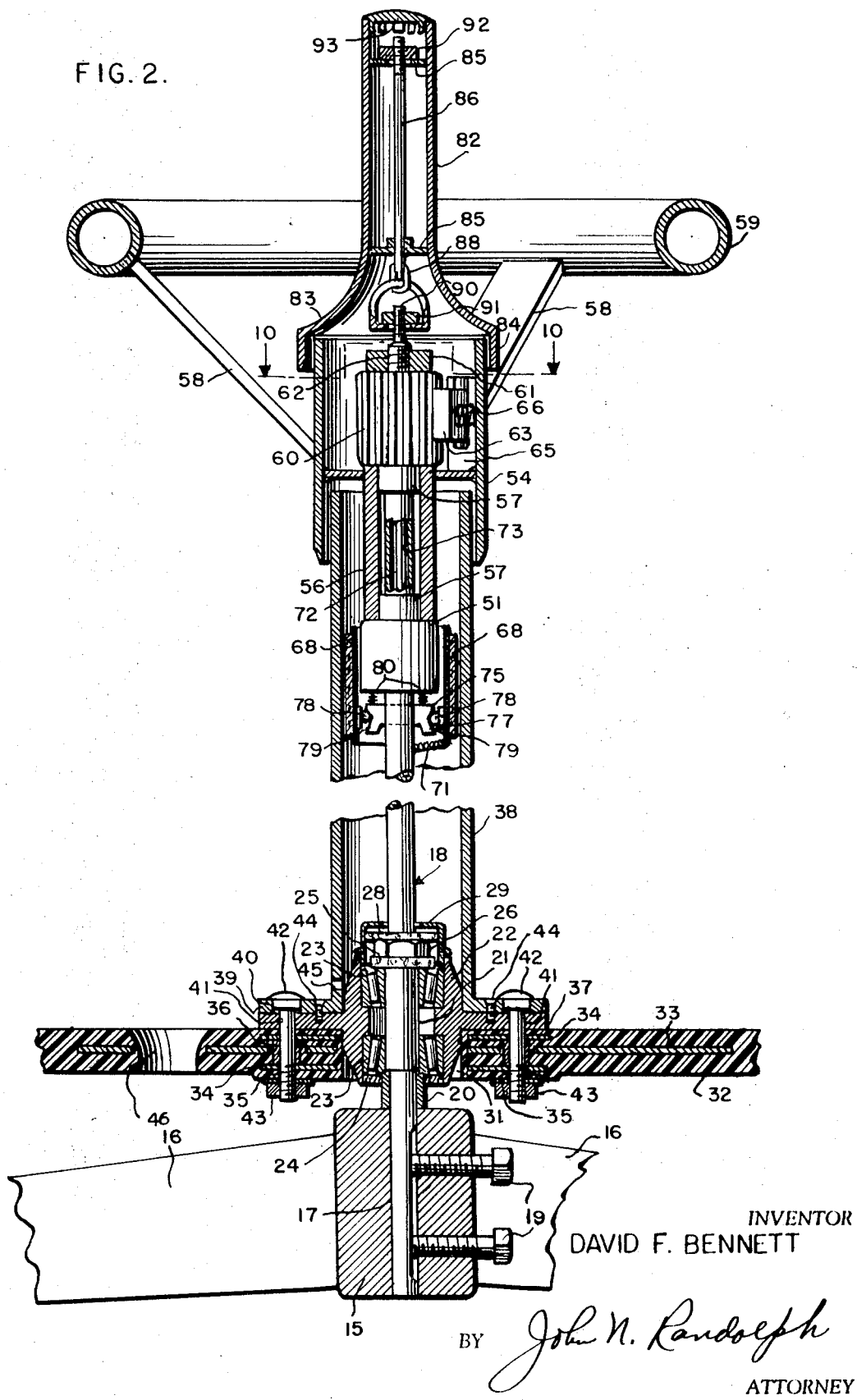

INVENTOR
DAVID F. BENNETT

BY *John N. Randolph*
ATTORNEY

INVENTOR
DAVID F. BENNETT

BY John N. Randolph
ATTORNEY

OCCUPANT PROPELLED MERRY-GO-ROUND

SUMMARY

It is a primary object of the present invention to provide an occupant propelled merry-go-round for children, capable of supporting one or more riders in a passenger compartment which is so constructed as to afford maximum safety to the users and wherein the propulsion force required to effect rotation of the passenger compartment may be applied by one or all of the riders.

Another object of the invention is to provide a merry-go-round including a handwheel which is centrally disposed within the passenger compartment, and which is capable of rotating in one direction only to turn in said direction with the passenger compartment while grasped by one or more of the riders, and so that rotational motion will be applied to the passenger compartment in said direction when torque is applied to the handwheel in the opposite direction.

A further object of the invention is to provide a merry-go-round having a brake to stop rotation of the passenger compartment including a manually actuated brake lever conveniently located to be actuated by any one of the passengers for applying the brake. Various other objects and advantages of the invention will hereinafter become more fully apparent from the following description of the drawings, illustrating a presently preferred embodiment thereof and wherein:

BRIEF DESCRIPTION OF THE DRAWINGS

FIG. 1 is a side elevational view, partially in vertical section of the merry-go-round;

FIG. 2 is an enlarged fragmentary central vertical sectional view thereof, partly in elevation;

FIG. 10 is an enlarged cross-sectional view taken substantially along a line 10—10 of FIG. 2, and FIG. 11 is a view similar to the upper portion of FIG. 2 but illustrating a different position of certain of the parts.

DESCRIPTION OF THE PREFERRED EMBODIMENT

Figure 3:
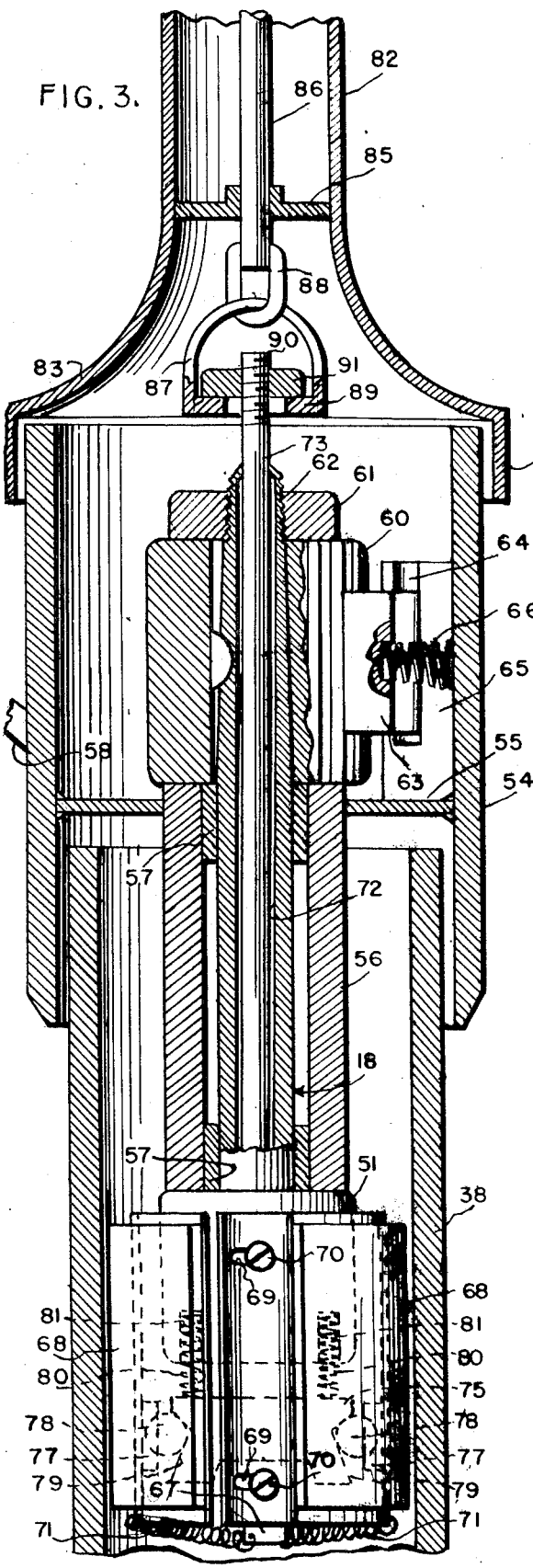
FIG. 3 is an enlarged central vertical sectional view, partly in elevation and partly broken away, of a portion of the structure as seen in FIG. 2.

Referring more specifically to the drawings, the merry-go-round in its entirety is designated generally 12 and includes a circular base 13 having an annular rim 14, a central hub 15 and spokes 16 extending between and connecting the rim and hub.

Figure 9:
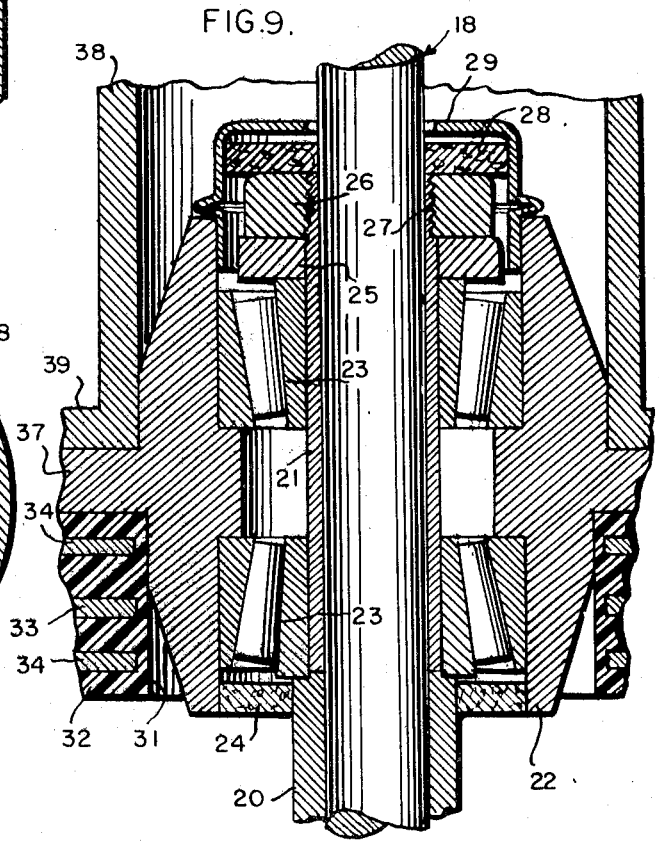
FIG. 9 is an enlarged fragmentary central vertical sectional view of another portion of the structure as illustrated in FIG. 2.

As seen in FIG. 2, the hub 15 has a central bore 17 to receive the lower end of a shaft 18 which is secured immovably therein by fastenings 19 and which is supported thereby in an upright position. A bushing or sleeve is disposed on the shaft 18 and has an externally thickened lower portion 20 resting on the hub 15, and an externally reduced upper portion 21 extending upwardly therefrom, centrally through a hub 22. Tapered roller bearings 23 are mounted in the upper and lower portions of the hub 22 around the sleeve portion 21. As best seen in Fig. 9, an annular seal 24 is disposed in the lower end of the hub 22 around the sleeve portion 20. A washer 25 bears against the upper end of the upper bearing 23 and is retained by a nut 26 which is threadly connected to the threaded upper end 27 of the sleeve portion 21. An annular seal 28 is disposed around the shaft 18 and bears on the nut 26. A dust cap 29 fits around the shaft 18 and seats in the upper end of the hub 22 for enclosing the seal 28, nut 26 and washer 25. The seals 24 and 28 protect the roller bearings 23 from dust or other foreign matter.

A circular tub-shaped passenger compartment 30 has a central opening 31 in the bottom 32 thereof which engages around the lower portion of the hub 22. Compartment 30 may be formed of various materials but is preferably formed of a plastic, such as fiberglas, in which case its bottom 32 is reinforced by steel plates 33 and 34 which are embedded therein, as seen in FIGS. 2 and 9. The bottom 32, around the opening 31, is provided with openings 35 which extends through the reinforcing plates 33 and 34 and which include metal sleeves 36 which extend through the plate 33 and between the plates 34.

The hub 22 has an annular outwardly extending flange 37 bearing on the upper side of the bottom 32 around its opening 31. A tubular column 38 rises from the flange 37 and is disposed around the upper portion of the hub 22 and concentrically around a substantial portion of the shaft 18. The column 38 has an out-turned flange 39 at its lower end which rests upon the flange 37 and which as openings 40 which align with openings 41 of the flange 37 and the openings 35 to receive carriage bolts 42 which extend through said openings. Nuts 43 threadedly engage the lower ends of the bolts 42, beneath the bottom 32, for securing the passenger compartment 30 and column 38 to the hub 22. The openings 40 are noncircular to receive noncircular portions of the heads of the bolts 42 for retaining said bolts against rotation in the flange 39. To facilitate assembling the unit the flange 39 is additionally secured to the flange 37 by screws 44. The lower portion of the column 38 is preferably provided with a small drainage opening 45 to carry off any moisture which might collect in said column, and the bottom 32 is provided with a drainage opening 46.

The passenger compartment 30 has an annular wall 47 extending upwardly from the periphery of its bottom 32, an annular seat 48 extending outwardly from the upper edge of the wall 47, an an annular backrest 49 extending upwardly from the periphery of the seat 48. The backrest 49 terminates at its upper edge in an annular outwardly and downwardly turned rim 50 for reinforcing the passenger compartment and to provide a smooth rounded upper surface over which the passengers can enter and leave the compartment 30.

Figure 6:
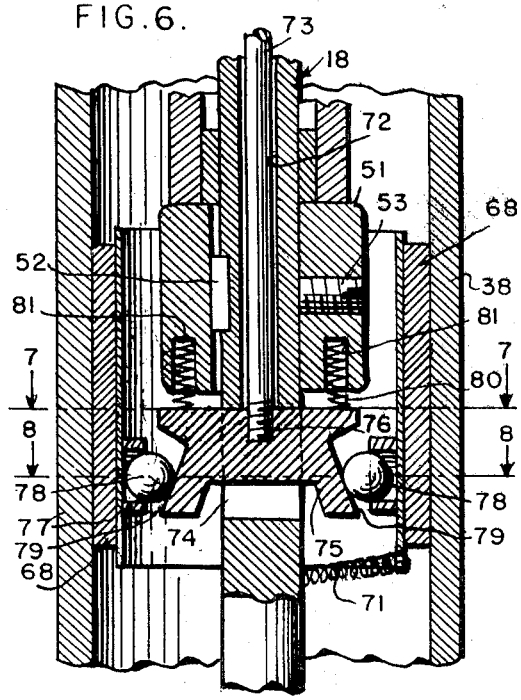
FIG. 6 is a view similar to FIG. 4 but illustrating a different position of certain of the parts.

As best seen in FIG. 6 a collar 51 is secured to the shaft 18 above and spaced from the hub 22 by a setscrew 53, and is retained against rotation relative to the shaft by a key 52. A tubular hub 54 is provided with a deck 55 in which is secured a sleeve 56 which is disposed around a portion of the shaft 18 and which has its lower end resting on the upper end of the collar 51, as seen in FIG. 3. The sleeve 56 has bushings 57 in its end which rotatably engage the shaft 18 for cooperation with the sleeve 56 and deck 55 in supporting the lower end of the hub 54 concentrically around and spaced from the upper end of the column 38. Spokes 58 extend outwardly and upwardly from the hub 54, as seen in FIG. 2, for supporting a handwheel 59 which is secured to the outer ends of said spokes.

A ratchet wheel 60 is keyed to the tapered upward portion of the shaft 18 and held thereon by nut 61 which engages the threaded upper end 62 of the shaft. The ratchet wheel 60 is disposed in the hub 54 above the deck 55. The nose of the pawl 63 engages the teeth of the ratchet wheel 60 and is pivotally mounted in a recess 64 of a block 65 which is secured to the interior of the hub 54. A compression spring 66 which is interposed between the wall of the hub 54 and the pawl 63 urges the pawl nose into engagement with the ratchet teeth.

Figure 4:
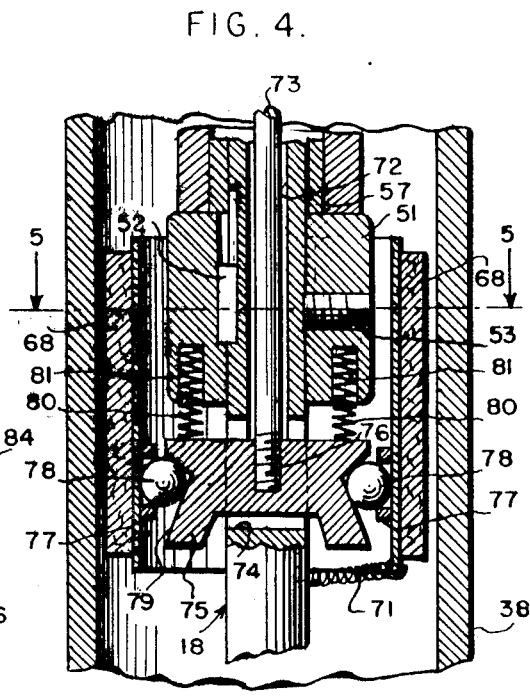
FIG. 4 is a fragmentary central vertical sectional view of a part of the structure shown in elevation in FIG. 3.
Figure 5:
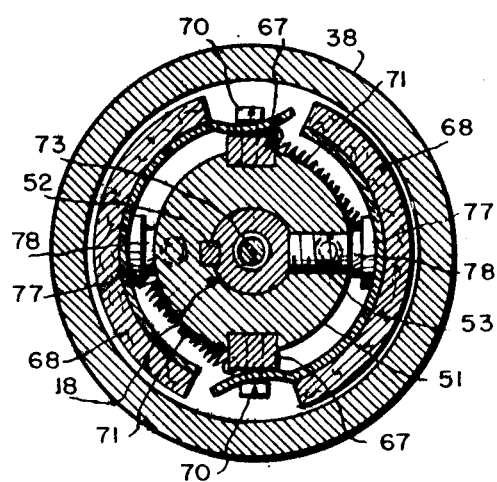
FIG. 5 is a cross-sectional view taken substantially along a plane as indicated by the line 5—5 of FIG. 4.
Figure 8:
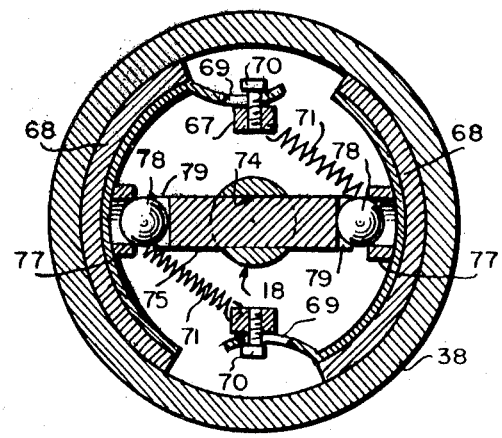
FIGS. 7 and 8 are cross-sectional views taken substantially along planes as indicated by the lines 7—7 and 8—8, respectively, of FIG. 6.
Figure 7:
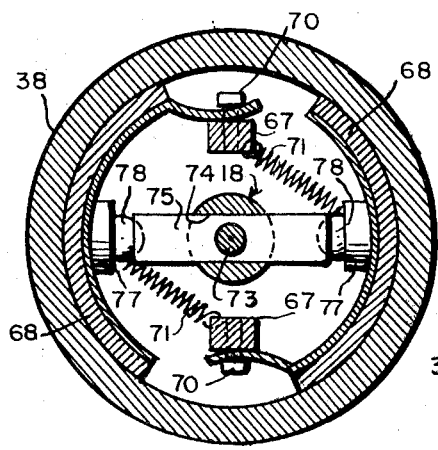

Diametrically opposed bars 67, as seen in FIGS. 3, 7 and 8, are secured to and extend downwardly from the collar 51 to provide pivotal supports for a pair of brakeshoes 68 which are disposed around the collar 51 and within the column 38. Each brakeshoe 68 has a longitudinal edge portion provided with openings 69 which loosely engage headed fastenings 70 which are anchored in the bars 67 for mounting the brakeshoes for swinging movement toward and away from the column 38. Pull Springs 71 are anchored to the lower ends of the bars 67 and are secured to bottom edges of the brakeshoes 68, midway of their side edges, for urging the brakeshoes inwardly and out of engagement with the column 38, as illustrated in FIGS. 3, 4 and 5.

The shaft 18 is tubular from below the collar 51 to its upper end, as seen in FIGS. 3 and 6, to provide a bore 72 to accommodate a pull rod 73. As seen in FIG. 6, the shaft 18 has a slot 74 extending transversely through the lower end of its tubular portion for accommodating an elongated block 75 having an upwardly opening socket 76 in which the lower end of the rod 73 is threadedly secured. As seen in FIGS. 7 and 8, the block 75 is disposed crosswise of a plane intersecting the bars 67 and in alignment with inwardly opening sockets 77 which are secured to the concave inner sides of the brakeshoes 68, and each of which contains a ball or sphere 78 which bears against a downwardly and outwardly sloping end surface 79 of the block 75. The surfaces 79 form cam surfaces for displacing the balls 78 outwardly to expand the brakeshoes 78, when the block or cam 75 is displaced upwardly by an upward pull of the rod 73. Compression springs 80 seat in and extend downwardly from sockets 81 of the collar 51 and bear against the upper side of the cam 75 for normally urging said cam downwardly to its position of FIG. 4 to allow the springs 71 to hold the brakeshoes 68 in retracted, inoperative positions out of contact with the column 38.

A tubular lever 82 has a bellshaped lower portion 83 which rests on the upper end of the hub 54, as seen in FIG. 2, and which has a depending annular flange 84 which surrounds and is spaced from the upper portion of said hub. The lever 82 has vertically spaced partitions 85 through which a rod 86 slidably extends. A bale member 87 is connected to the lower end of the rod 86 by a loop 88. The bale member has a ring-shaped bottom 89 through which the threaded upper end 90 of the rod 73 extends to receive a nut 91 which rests on the ring member 89 and combines therewith to form a swivel connection between the rod 73 and the rod 86. A nut 92 threadedly engages the upper end of the rod 86 and bears on the upper partition 85 to retain said rod against downward displacement through the lever 82. A detachable closure cap 93 is attached to and closes the upper end of the lever 82.

The merry-go-round 12 may be used indoors and outdoors and the rim 14 which may rest upon any suitable horizontal supporting surface, not shown, may be anchored down by fastenings, not shown, which extend through appertured ears 94 which are secured to and project inwardly from a bottom flange of the rim 14. One or a number of children may occupy the passenger compartment 30, sitting on the seat 48 with their feet resting on the bottom 32. One or more of the riders may grasp the handwheel 59 to exert a torsional force thereon in a clockwise direction, as seen in FIG. 10. The pawl and ratchet 63,60 will prevent the handwheel 59 from turning clockwise, causing the compartment 30 with its passengers to revolve in the opposite direction or counterclockwise. The riders grip on the handwheel 59 does not have to be released as the handwheel can turn with the tub 30 in a counterclockwise direction, with the pawl riding over the ratchet teeth until another torsional force is applied to the handwheel in a clockwise direction for accelerating the counterclockwise rotation of the compartment 30. During this movement, the lever 82 is in its position of FIGS. 1 and 2 so that the brakeshoes 68 are out of contact with the column 38. To stop rotation of the compartment 30, it is only necessary for one of the riders to rock the lever 82 from its upright position of FIG. 2 to its inclined position of FIG. 11, to exert an upward pull on the rod 73 for displacing the cam 75 upwardly to swing the brakeshoes 68 outwardly and into engagement with the column 38, for stopping rotation of the compartment 39 which is secured to and rotates with the column 38. Adjustment of the brakes is accomplished by removing the cap 93 and tightening the nut 92.

The lower portion of the hub 54 provides an apron around the open upper end of the column 38 to substantially exclude all dirt and foreign matter as well as substantially all moisture.

Various modifications and changes are contemplated and may be resorted to without departing from the function or scope of the invention.

I claim:

1. An occupant propelled merry-go-round comprising a stationary base, a shaft secured immovably to and rising from said base, a hub rotatably mounted on said shaft, a tubular column fixed to and rising from the hub and disposed around the shaft, a passenger supporting member fixed to the hub and disposed around the column for rotation with the hub and column, a handwheel supported by the shaft above the column, means connecting the handwheel to the shaft for rotation of the handwheel in one direction only relative to the shaft whereby when torque is applied to the handwheel in the opposite direction the passenger supporting member will be caused to revolve in said first mentioned direction, and brake means supported by the shaft for applying an outwardly directed braking force to the column, said brake means including a lever mounted for universal rocking movement on said handwheel for manually applying the brake means.

2. A merry-go-round as in claim 1, said passenger supporting member comprising a tub-shaped compartment including a bottom central portion secured to the hub and forming a footrest, an annular seat disposed above and spaced outwardly from said bottom, and an annular backrest surrounding and extending upwardly from the seat.

3. A merry-go-round as in claim 1, said passenger supporting member including a substantially flat bottom having a central portion secured to the hub and forming a passenger footrest, an annular seat disposed above and spaced outwardly from the footrest, and means connecting the footrest and seat.

4. A merry-go-round as in claim 1, said means comprising a ratchet wheel having teeth secured to the shaft, and a spring pressed pawl carried by the handwheel and engaging the ratchet wheel teeth.

5. A merry-go-round as in claim 1, said brake means additionally including brakeshoes swingably supported on said shaft within said column, and cam means slidably connected to the shaft and engaging the brakeshoes for displacing the brakeshoes outwardly and into frictional engagement with the column when said cam means is displaced in one direction.

6. A merry-go-round as in claim 5, and a pull rod connecting said lever and cam means for moving the cam means in a direction for applying the brake means when the lever is manually rocked in any direction form an upright to an inclined position.

7. A merry-go-round as in claim 6, said brake means additionally including spring means for moving the cam means in the opposite direction, and pull springs for urging the brakeshoes inwardly to released positions out of engagement with the column.